(12) United States Patent
Scott

(10) Patent No.: US 12,478,498 B2
(45) Date of Patent: *Nov. 25, 2025

(54) URINE COLLECTION SYSTEMS, AND METHODS OF MAKING AND USING THE SAME

(71) Applicant: James William Scott, Crawfordville, FL (US)

(72) Inventor: James William Scott, Crawfordville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/256,472

(22) Filed: Jul. 1, 2025

(65) Prior Publication Data

US 2025/0325395 A1    Oct. 23, 2025

Related U.S. Application Data

(63) Continuation-in-part of application No. 17/868,092, filed on Jul. 19, 2022, now Pat. No. 12,343,245.

(51) Int. Cl.
*A61F 5/44* (2006.01)

(52) U.S. Cl.
CPC ................................. *A61F 5/4401* (2013.01)

(58) Field of Classification Search
CPC .............. A61F 5/4401; A61F 13/5123; A61F 2013/15146; A61F 2013/5127; A61F 2013/51372
See application file for complete search history.

(56) References Cited

U.S. PATENT DOCUMENTS

| | | | |
|---|---|---|---|
| 3,929,135 A * | 12/1975 | Thompson | B32B 3/28 604/374 |
| 4,645,500 A | 2/1987 | Steer | |
| 5,176,667 A | 1/1993 | Debring | |
| 5,713,884 A | 2/1998 | Osborn, III et al. | |
| 6,202,689 B1 | 3/2001 | Williams | |
| 7,102,054 B1 | 9/2006 | Cree et al. | |
| 11,413,206 B1 * | 8/2022 | Lance | A61G 13/102 |
| 12,343,245 B2 * | 7/2025 | Scott | A61F 13/5123 |
| 2003/0124928 A1 * | 7/2003 | Sherrod | A47C 27/006 442/79 |
| 2015/0313766 A1 | 11/2015 | Miao et al. | |

* cited by examiner

*Primary Examiner* — Susan S Su
*Assistant Examiner* — Erin A Kim
(74) *Attorney, Agent, or Firm* — Thomas | Horstemeyer, LLP

(57) ABSTRACT

Urine collection systems and related methods in which the urine collection system comprises: (A) a perforated sheet that includes a plurality of apertures that allow for one-way flow through the apertures, and (B) a bottom urine collection sheet, positioned below the perforated sheet, comprising one or more grooves, where each groove has a respective groove length, groove width, and groove depth for allowing the groove to facilitate collection of urine by the bottom sheet. In particular embodiments, the grooves are dimensioned to route urine into a central collection area defined by the bottom sheet from which the urine is then removed by a suction source.

23 Claims, 12 Drawing Sheets

URINE COLLECTION SYSTEMS, AND METHODS OF MAKING AND USING THE SAME

CROSS REFERENCE TO RELATED APPLICATIONS

This application is a continuation-in-part of U.S. patent application Ser. No. 17/868,092, filed Jul. 19, 2022, which is hereby incorporated herein by reference in its entirety.

FIELD OF THE INVENTION

Various embodiments of the present invention are directed to urine collection systems and to methods of making and using urine collection systems.

BACKGROUND

Urinary catheters pose numerous problems for patients and hospitals including, but not limited to, patient infections. Absorbent pads may be placed underneath a patient to collect urine, but typically, the pads become soaked in urine, causing discomfort for the patient, and a mess for the patient's caregiver and/or hospital.

Efforts continue to further develop urine collection systems that provide one or more advantages over known urine collection systems.

SUMMARY

Urine collection systems, according to various embodiments, comprise: a perforated sheet having a perforated sheet outer periphery, a perforated sheet upper surface, a perforated sheet lower surface, and a plurality of perforated sheet apertures (i) within the perforated sheet outer periphery, and (ii) extending from the perforated sheet upper surface to the perforated sheet lower surface; wherein at least a portion of the perforated sheet apertures within the plurality of perforated sheet apertures comprises a urine backflow feature that allows one-way urine flow through a given perforated sheet aperture, and prevents urine backflow through the given perforated sheet aperture.

In another exemplary embodiment, the urine collection systems of the present invention comprise: (I) a perforated sheet having a perforated sheet outer periphery, a perforated sheet upper surface, a perforated sheet lower surface, and a plurality of perforated sheet apertures (i) within the perforated sheet outer periphery, and (ii) extending from the perforated sheet upper surface to the perforated sheet lower surface; wherein at least a portion of the perforated sheet apertures within the plurality of perforated sheet apertures comprises a urine backflow feature that allows one-way urine flow through a given perforated sheet aperture, and prevents urine backflow through the given perforated sheet aperture; and (II) an absorbent layer positioned below the perforated sheet, the absorbent layer comprising a fiber-containing layer.

In yet another exemplary embodiment, the urine collection systems of the present invention comprise: (I) a perforated sheet having a perforated sheet outer periphery, a perforated sheet upper surface, a perforated sheet lower surface, and a plurality of perforated sheet apertures (i) within the perforated sheet outer periphery, and (ii) extending from the perforated sheet upper surface to the perforated sheet lower surface; wherein at least a portion of the perforated sheet apertures within the plurality of perforated sheet apertures comprises a urine backflow feature that allows one-way urine flow through a given perforated sheet aperture, and prevents urine backflow through the given perforated sheet aperture; and (II) a bottom sheet positioned below the perforated sheet, the bottom sheet having a bottom sheet upper surface, a bottom sheet lower surface, a major surface portion extending within a plane containing the bottom sheet upper surface, and one or more grooves along a bottom sheet outer periphery of the bottom sheet upper surface.

A urine collection system according to further embodiments comprises: (A) a perforated sheet having a perforated sheet outer periphery, a perforated sheet upper surface, a perforated sheet lower surface, and a plurality of perforated sheet apertures (i) within the perforated sheet outer periphery, and (ii) extending from the perforated sheet upper surface to the perforated sheet lower surface, wherein: at least a portion of the perforated sheet apertures within the plurality of perforated sheet apertures comprise a urine backflow feature that allows one-way urine flow through a given perforated sheet aperture, and prevents urine backflow through the given perforated sheet aperture; and (B) a bottom urine collection sheet positioned below the perforated sheet, the bottom urine collection sheet having a bottom sheet upper surface, a bottom sheet lower surface, and one or more grooves defined by the bottom sheet upper surface, wherein each groove has a respective groove length, groove width, and groove depth that facilitates collection of urine by the bottom sheet.

Various embodiments further relate to methods of making urine collection systems. In one exemplary embodiment, the method of making an urine collection system comprises: forming a perforated sheet, wherein the perforated sheet has a perforated sheet outer periphery, a perforated sheet upper surface, a perforated sheet lower surface, and a plurality of perforated sheet apertures (i) within the perforated sheet outer periphery, and (ii) extending from the perforated sheet upper surface to the perforated sheet lower surface; wherein at least a portion of the perforated sheet apertures within the plurality of perforated sheet apertures comprises a urine backflow feature that allows one-way urine flow through a given perforated sheet aperture, and prevents urine backflow through the given perforated sheet aperture.

Various embodiments further relate to methods of using urine collection systems. In one exemplary embodiment, a method of using a urine collection system comprises a method of collecting urine from a patient, wherein the method comprise: positioning a perforated sheet under the patient, wherein the perforated sheet has a perforated sheet outer periphery, a perforated sheet upper surface, a perforated sheet lower surface, and a plurality of perforated sheet apertures (i) within the perforated sheet outer periphery, and (ii) extending from the perforated sheet upper surface to the perforated sheet lower surface; wherein at least a portion of the perforated sheet apertures within the plurality of perforated sheet apertures comprises a urine backflow feature that allows one-way urine flow through a given perforated sheet aperture, and prevents urine backflow through the given perforated sheet aperture.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein.

DETAILED DESCRIPTION

Figure 1:
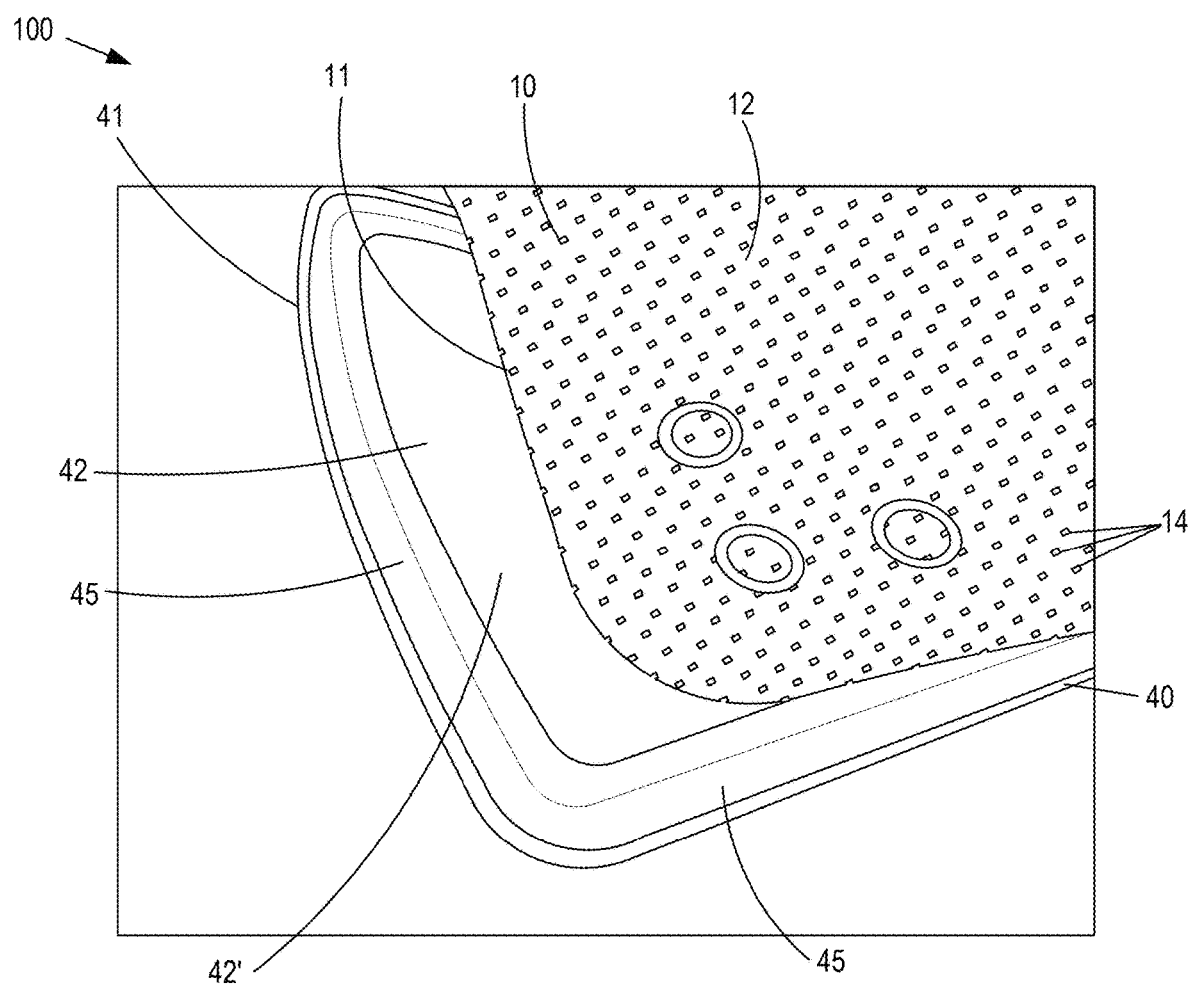
FIG. 1 is a perspective view of an exemplary urine collection system of the present invention.
Figure 2:
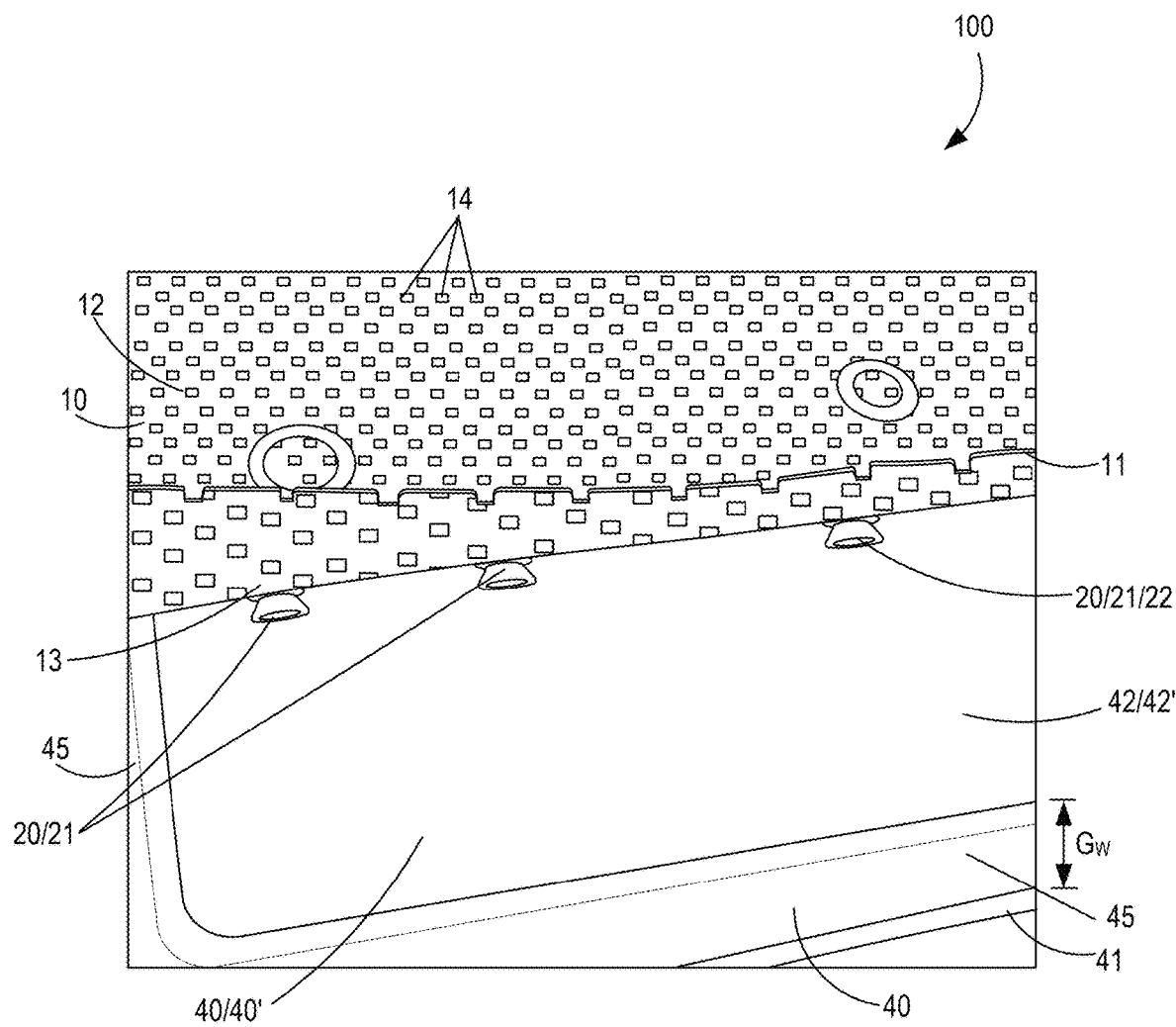
FIG. 2 is another perspective view of the exemplary urine collection system shown in FIG. 1 with a perforated sheet lower surface displayed.
Figure 3:
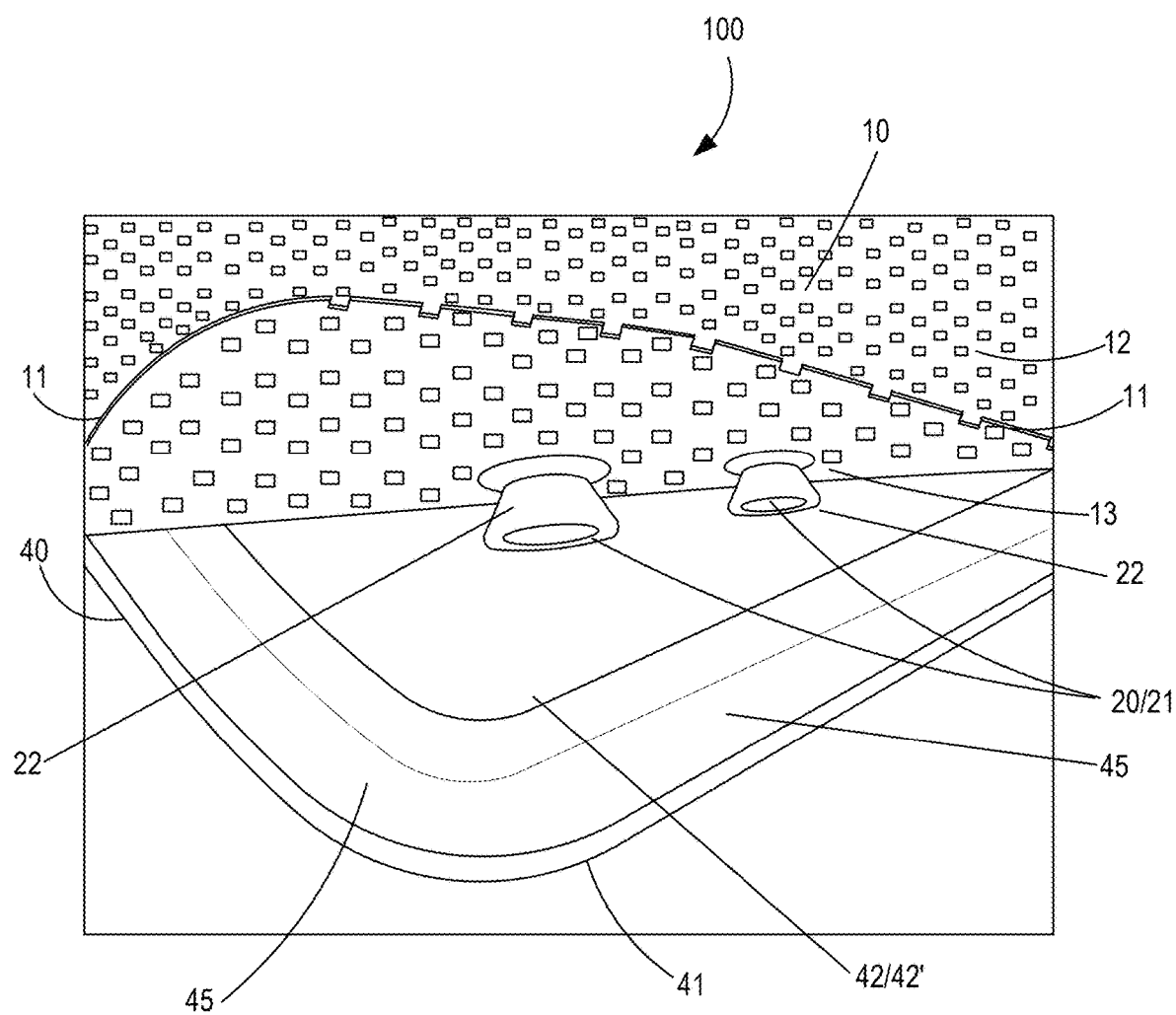
FIG. 3 is a close-up view of an exemplary perforated sheet lower surface of the exemplary urine collection system shown in FIG. 1.
Figure 4:
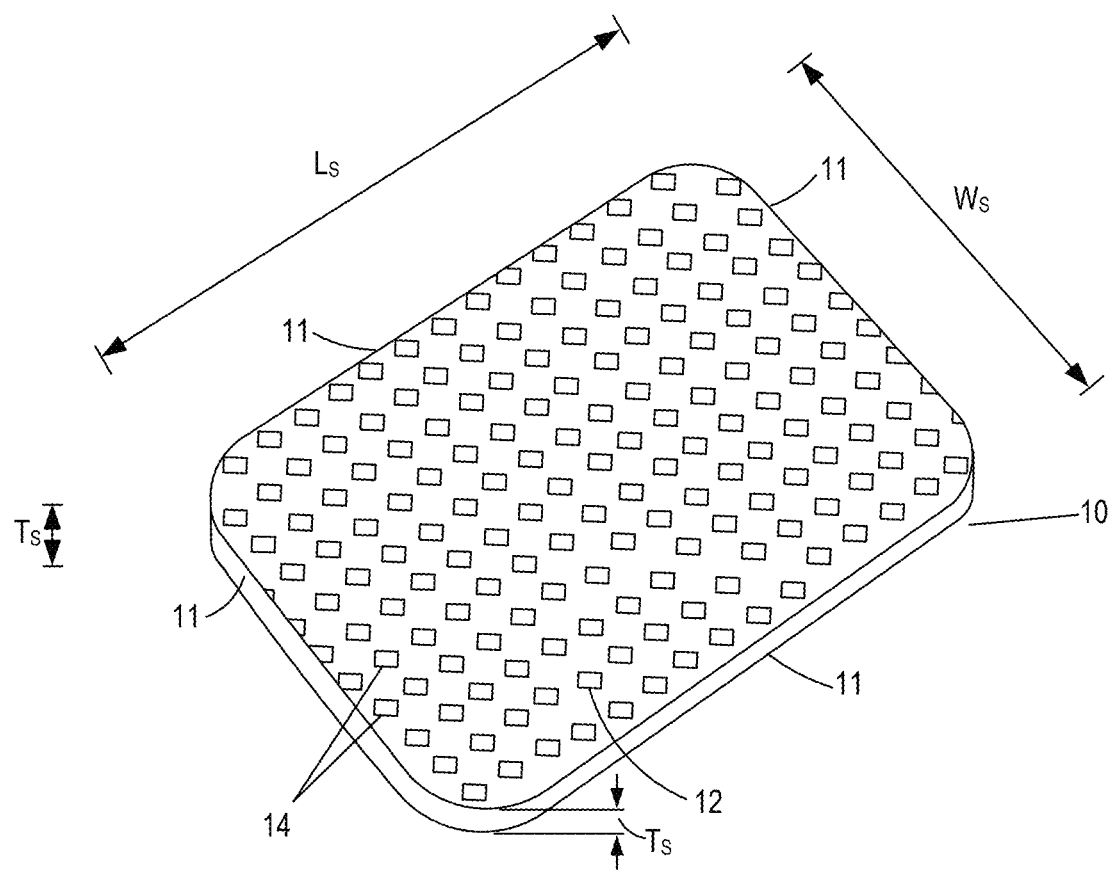
FIG. 4 is a perspective view of an exemplary perforated sheet suitable for use in the exemplary urine collection system shown in FIG. 1.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

With continued reference to the drawings, the present invention will be described with respect to several embodiments showing urine collection systems. FIGS. 1-4, and 11-12 show one exemplary urine collection system 100 of the present invention. As shown in FIGS. 1-4, and 11-12, exemplary urine collection system 100 comprises: (I) a perforated sheet 10 having a perforated sheet outer periphery 11, a perforated sheet upper surface 12, a perforated sheet lower surface 13, and a plurality of perforated sheet apertures 14 (i) within the perforated sheet outer periphery 11, and (ii) extending from the perforated sheet upper surface 12 to the perforated sheet lower surface 13, wherein at least a portion of the perforated sheet apertures 14 within the plurality of perforated sheet apertures 14 comprises a urine backflow feature 15 that allows one-way urine flow through a given perforated sheet aperture 14, and prevents urine backflow through the given perforated sheet aperture 14; and (II) a bottom sheet 40 positioned below the perforated sheet 10, the bottom sheet 40 having a bottom sheet upper surface 42, a bottom sheet lower surface 43, a major surface portion 42' extending within a plane P containing the bottom sheet upper surface 42, and one or more grooves 45 along a bottom sheet outer periphery 41 of the bottom sheet upper surface 42, wherein each groove 45 has a groove length GL, a groove width GW, and a groove depth GD that enables collection of urine along the bottom sheet outer periphery 41 of the bottom sheet upper surface 42.

Figure 10:
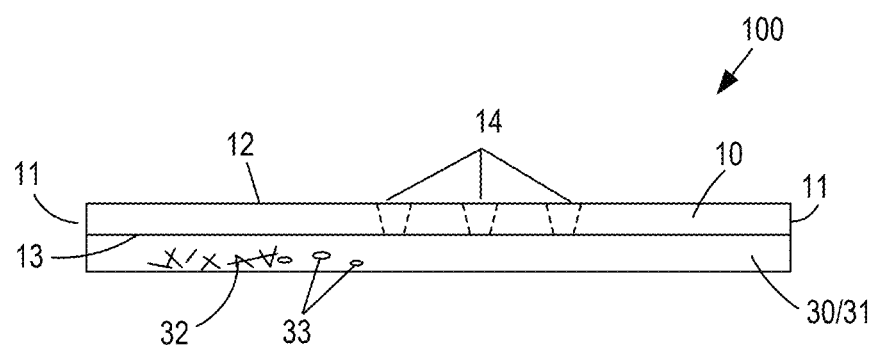
FIG. 10 is a side view of another exemplary urine collection system of the present invention, wherein the exemplary urine collection system comprises a perforated sheet as shown in FIG. 4 in combination with an absorbent layer.
Figure 11:
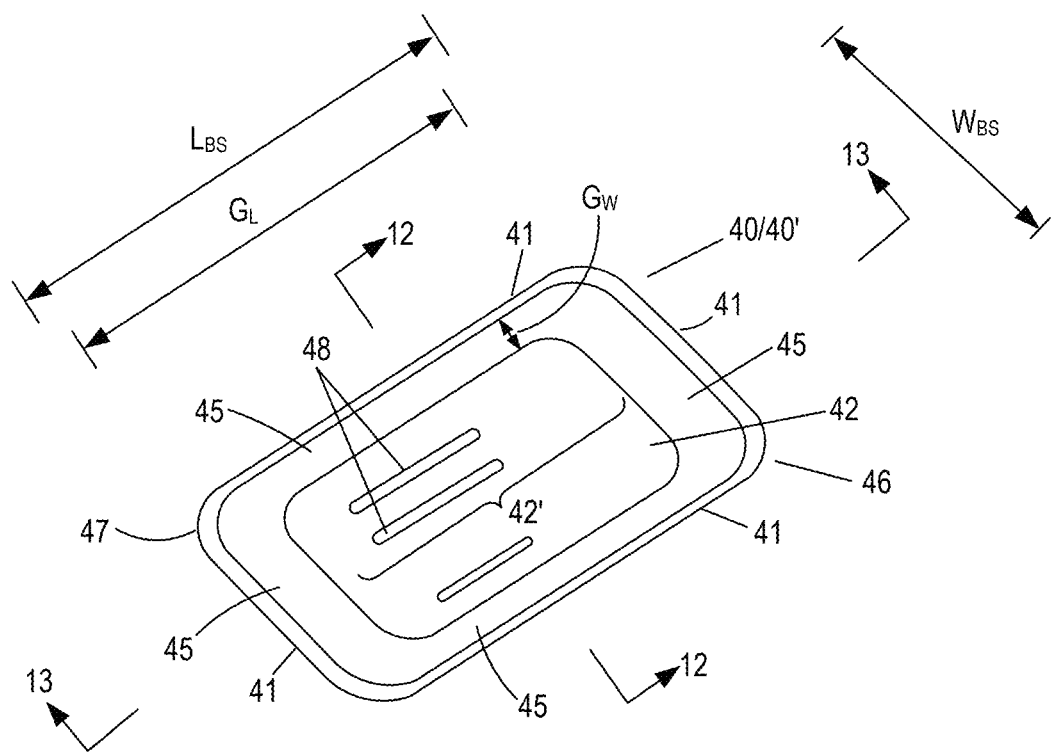
FIG. 11 is a perspective, top view of an exemplary bottom sheet suitable for use in the urine collection systems of the present invention including the exemplary urine collection system shown in FIG. 1.
Figure 12:
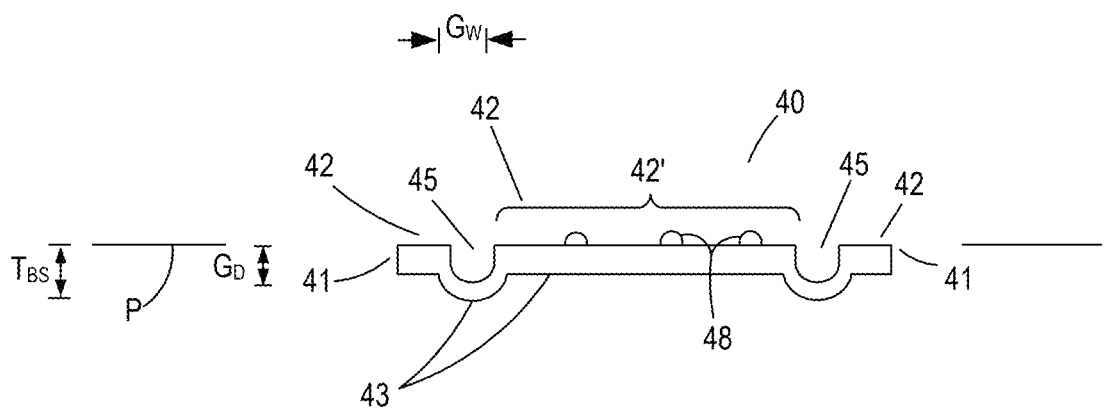
FIG. 12 is a cross-sectional view of the exemplary bottom sheet shown in FIG. 11 as viewed along line 12-12 shown in FIG. 11.

FIG. 10 shows another exemplary urine collection system 100 of the present invention. As shown in FIG. 10, exemplary urine collection system 100 comprises: (I) a perforated sheet 10 having a perforated sheet outer periphery 11, a perforated sheet upper surface 12, a perforated sheet lower surface 13, and a plurality of perforated sheet apertures 14 (i) within the perforated sheet outer periphery 11, and (ii) extending from the perforated sheet upper surface 12 to the perforated sheet lower surface 13, wherein at least a portion of the perforated sheet apertures 14 within the plurality of perforated sheet apertures 14 comprises a urine backflow feature 15 that allows one-way urine flow through a given perforated sheet aperture 14, and prevents urine backflow through the given perforated sheet aperture 14; and (II) an absorbent layer 30 that is positionable below the perforated sheet 10, the absorbent layer 30 comprising a fiber-containing layer 31.

Other exemplary urine collection systems 100 of the present invention comprise: (I) a perforated sheet 10 having a perforated sheet outer periphery 11, a perforated sheet upper surface 12, a perforated sheet lower surface 13, and a plurality of perforated sheet apertures 14 (i) within the perforated sheet outer periphery 11, and (ii) extending from the perforated sheet upper surface 12 to the perforated sheet lower surface 13, wherein at least a portion of the perforated sheet apertures 14 within the plurality of perforated sheet apertures 14 comprises a urine backflow feature 15 that allows one-way urine flow through a given perforated sheet aperture 14, and prevents urine backflow through the given perforated sheet aperture 14; (II) an absorbent layer 30 that is positionable below the perforated sheet 10, the absorbent layer 30 comprising a fiber-containing layer 31; and (III) a bottom sheet 40 positioned below the perforated sheet 10 and the absorbent layer 30, the bottom sheet 40 having a bottom sheet upper surface 42, a bottom sheet lower surface 43, a major surface portion 42' extending within a plane P containing the bottom sheet upper surface 42, and one or more grooves 45 along a bottom sheet outer periphery 41 of the bottom sheet upper surface 42, wherein each groove 45 has a groove length GL, a groove width GW, and a groove depth GD that enables collection of urine along the bottom sheet outer periphery 41 of the bottom sheet upper surface 42.

The (I) urine collection systems 10, (II) methods of making urine collection systems, and (III) methods of using urine collection systems 10 are further described in the following additional embodiments.

ADDITIONAL EMBODIMENTS

Urine Collection Systems

1. A urine collection system 100 comprising: a perforated sheet 10 having a perforated sheet outer periphery 11, a perforated sheet upper surface 12, a perforated sheet lower surface 13, and a plurality of perforated sheet apertures 14 (i) within the perforated sheet outer periphery 11, and (ii) extending from said perforated sheet upper surface 12 to said perforated sheet lower surface 13; wherein at least a portion of the perforated sheet apertures 14 within said plurality of perforated sheet apertures 14 comprises a urine backflow feature 15 that allows one-way urine flow through a given perforated sheet aperture 14, and prevents urine backflow through the given perforated sheet aperture 14.

2. The urine collection system 100 of embodiment 1, wherein said perforated sheet 10 has a perforated sheet length LS of up to about 8.0 feet (ft), a perforated sheet width WS of up to about 6.0 ft, and a perforated sheet thickness TS of up to about 2.0 centimeters (cm). It should be understood that perforated sheet 10 may have any desired dimensions.

3. The urine collection system 100 of embodiment 1 or 2, wherein said perforated sheet 10 has a perforated sheet length LS of from about 2.0 ft to about 4.0 ft, a perforated sheet width WS of from about 2.0 ft to about 4.0 ft, and a perforated sheet thickness TS of from about 1.0 cm to about 1.5 cm.

4. The urine collection system 100 of any one of embodiments 1 to 3, wherein said urine backflow feature 15 comprises an aperture shape 15' that prevents urine backflow.

Figure 5:
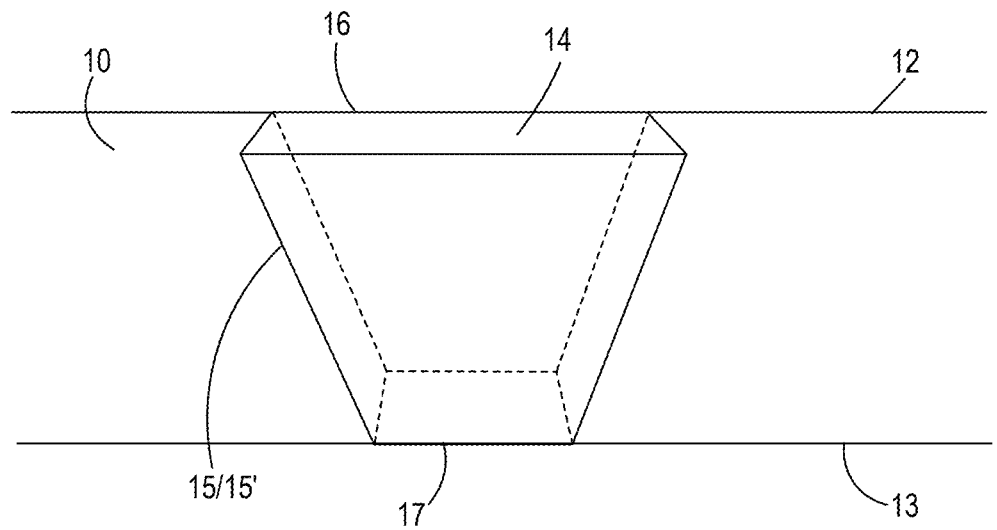
FIG. 5 is a side, cut-away view of an exemplary aperture shape suitable for use in the exemplary urine collection system shown in FIG. 1.

5. The urine collection system 100 of embodiment 4, wherein said aperture shape 15' comprises a cone shape 15' having a larger aperture inlet 16 along said perforated sheet upper surface 12 and a smaller aperture outlet 17 along said perforated sheet lower surface 13. See, for example, FIG. 5.

6. The urine collection system 100 of any one of embodiments 1 to 5, wherein said urine backflow feature 15 comprises one or more inner flow-controlling members 15" positioned within a given perforated sheet aperture 14. See, for example, FIG. 6.

Figure 6:
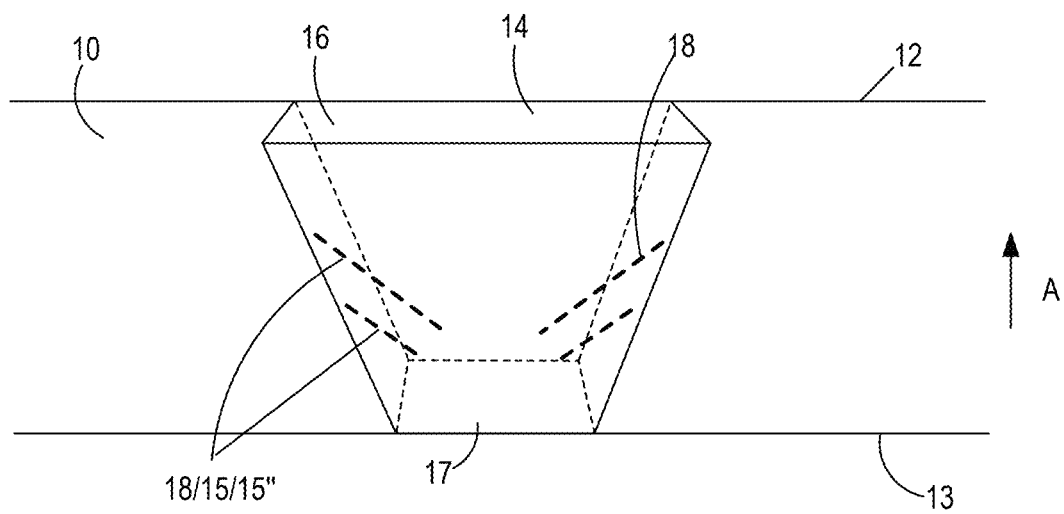
FIG. 6 is a side, cut-away view of an exemplary aperture with inner flow-controlling members therein, which is suitable for use in the exemplary urine collection system shown in FIG. 1.

7. The urine collection system 100 of embodiment 6, wherein said one or more inner flow-controlling members 15" comprise one or more aperture flaps 18 that move towards said perforated sheet upper surface 12 to close said given perforated sheet aperture 14 when exposed to urine backflow. As shown in FIG. 6, one or more aperture flaps 18 move in direction A depending on whether the one or more aperture flaps 18 are subjected to urine backflow pressure.

Figure 7:
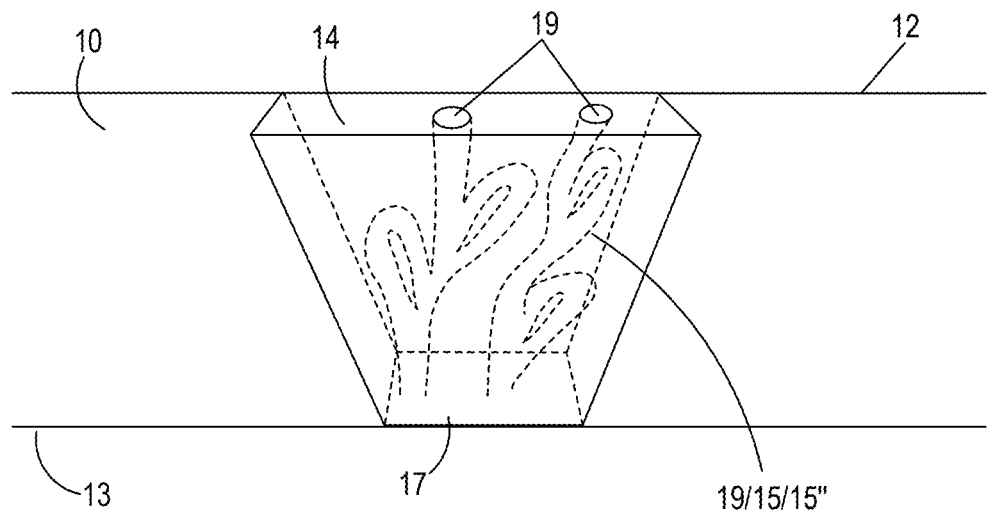
FIG. 7 is a side, cut-away view of an exemplary aperture with a Tesla valve (i.e., fluid flow) configuration, which is suitable for use in the exemplary urine collection system shown in FIG. 1.

8. The urine collection system 100 of embodiment 6, wherein said one or more inner flow-controlling members 15" comprise a Tesla valve configuration 19. See, for example, FIG. 7.

9. The urine collection system 100 of any one of embodiments 1 to 8, wherein said urine backflow feature 15 comprises one or more outlet flow-controlling members 15''' positioned along said perforated sheet lower surface 13 at an aperture outlet 17 of a given perforated sheet aperture 14.

Figure 8:
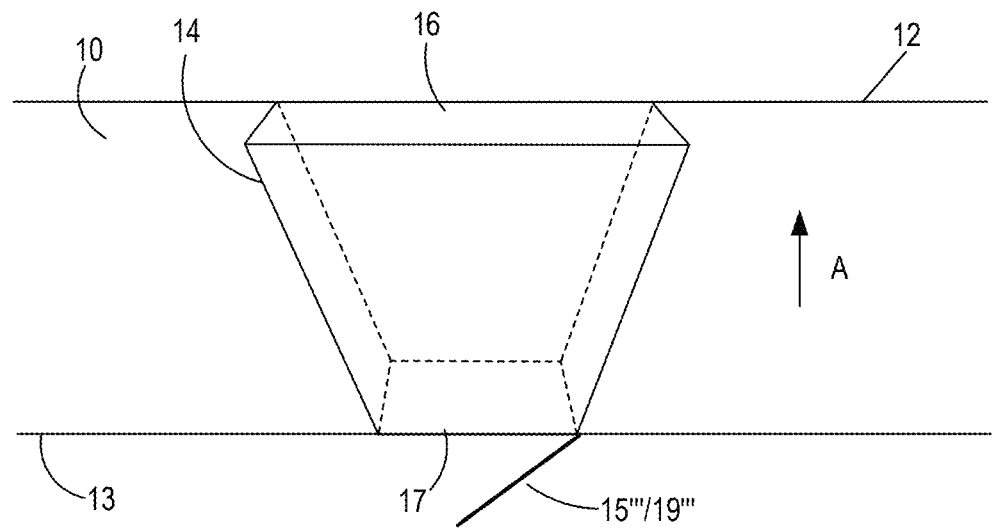
FIG. 8 is a side, cut-away view of an exemplary aperture with an outer flow-controlling member, which is suitable for use in the exemplary urine collection system shown in FIG. 1.
Figure 9:
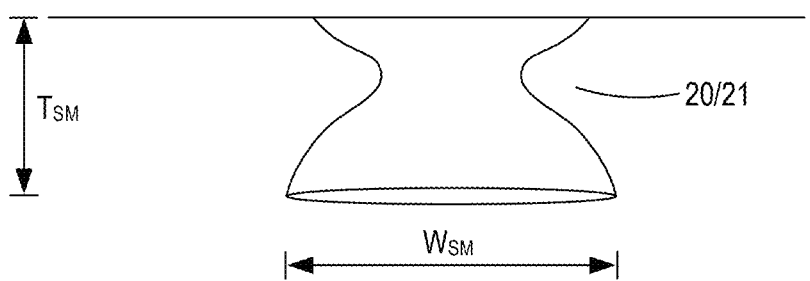
FIG. 9 is a side view of an exemplary suction cup suitable for use in the exemplary urine collection system shown in FIG. 1.

10. The urine collection system 100 of embodiment 9, wherein said one or more outlet flow-controlling members 15''' comprise one or more outlet flaps 19''' that move towards said perforated sheet upper surface 12 (i.e., in direction A) to close said given perforated sheet aperture 14 when exposed to urine backflow. See, for example, FIG. 8.

11. The urine collection system 100 of any one of embodiments 1 to 10, wherein all of the perforated sheet apertures 14 within said plurality of perforated sheet apertures 14 comprise said urine backflow feature 15.

12. The urine collection system 100 of any one of embodiments 1 to 11, wherein said plurality of perforated sheet apertures 14 comprises from about 20 to about 200 apertures 14 per square foot of said perforated sheet upper surface 12. It should be understood that perforated sheet 10 may have any number of perforated sheet apertures 14 per square foot of said perforated sheet upper surface 12.

13. The urine collection system 100 of any one of embodiments 1 to 12, wherein said plurality of perforated sheet apertures 14 comprises from about 100 to about 200 apertures 14 per square foot of said perforated sheet upper surface 12.

14. The urine collection system 100 of any one of embodiments 1 to 13, wherein said perforated sheet 10 comprises a non-absorbent, polymeric sheet 10. It should be understood that perforated sheet 10 may be formed from any type of polymer, and/or other elastomeric materials, either alone or in combination with one another and other possible materials such as synthetic (e.g., polymeric) or natural (e.g., cellulosic) fibers have any number of perforated sheet apertures 14 per square foot of said perforated sheet upper surface 12.

15. The urine collection system 100 of any one of embodiments 1 to 14, wherein said perforated sheet 10 comprises a non-absorbent, polypropylene sheet 10.

16. The urine collection system 100 of any one of embodiments 1 to 15, wherein said perforated sheet 10 further comprises a plurality of support members 20 extending from said perforated sheet lower surface 12, said plurality of support members 20 being capable of positioning said perforated sheet 10 above a flat surface 80 (e.g., a bed mattress top surface 81, a stretcher top surface (not shown), or a major surface portion 42' of a bottom sheet upper surface 42, discussed below). See, for example, FIGS. 2-3, 9, and 14.

17. The urine collection system 100 of embodiment 16, wherein said plurality of support members 20 comprise a plurality of suction cups 21. See again, for example, FIGS. 2-3, and 9.

18. The urine collection system 100 of embodiment 16 or 17, wherein said plurality of support members 20 comprises from about 16 to about 150 support members 20 per square foot of said perforated sheet lower surface 13. It should be understood that any number of support members 20 per square foot of said perforated sheet lower surface 13 may be used.

19. The urine collection system 100 of any one of embodiments 16 to 18, wherein said plurality of support members 20 comprises from about 36 to about 64 support members 20 per square foot of said perforated sheet lower surface 13. It should be understood that each support member 20 may have any desired size and dimensions. Typically, each support member 20 has an overall width WSM of from about 1.0 cm to about 4.0 cm, more typically, from about 1.0 cm to about 2.0 cm, and an overall thickness (i.e., height) TSM of from about 1.0 cm to about 4.0 cm, more typically, from about 1.0 cm to about 2.0 cm. See again, for example, FIG. 9.

20. The urine collection system 100 of any one of embodiments 16 to 19, wherein each support member 20 of said plurality of support members 20 comprises a non-absorbent, polymeric material 22. It should be understood that support members 20 may be formed from any type of polymer, and/or other elastomeric materials, either alone or in combination with one another and other possible materials such as synthetic (e.g., polymeric) or natural (e.g., cellulosic) fibers.

21. The urine collection system 100 of any one of embodiments 16 to 20, wherein each support member 20 of said plurality of support members 20 comprises polypropylene 22.

22. The urine collection system 100 of any one of embodiments 16 to 21, wherein each support member 20 of said plurality of support members 20 is integrally connected to said perforated sheet lower surface 13.

23. The urine collection system 100 of any one of embodiments 1 to 22, further comprising: an absorbent layer 30 positioned below said perforated sheet 10, said absorbent layer 30 comprising a fiber-containing layer 31. See, for example, FIG. 10.

24. The urine collection system 100 of embodiment 23, wherein said absorbent layer 30 comprises synthetic fibers 32, natural fibers 32, superabsorbent particles 33, or any combination thereof.

25. The urine collection system 100 of embodiment 23 or 24, wherein said absorbent layer 30 covers more than 50% of said perforated sheet lower surface 13.

26. The urine collection system 100 of any one of embodiments 23 to 25, wherein said absorbent layer 30 has a basis weight of up to about 100 grams per square meter (gsm). It should be understood that absorbent layer 30 may have any desired basis weight of up to about 100 gsm or greater.

27. The urine collection system 100 of any one of embodiments 1 to 26, further comprising: a bottom sheet 40 positioned below said perforated sheet 10, said bottom sheet 40 having a bottom sheet upper surface 42, a bottom sheet lower surface 43, a major surface portion 42' extending within a plane P containing said bottom sheet upper surface 42, and one or more grooves 45 along a bottom sheet outer periphery 41 of said bottom sheet upper surface 42, wherein each groove 45 has a groove length GL, a groove width GW, and a groove depth GD that enables collection of urine along said bottom sheet outer periphery 41 of said bottom sheet upper surface 42. See, for example, FIGS. 11-12.

28. The urine collection system 100 of embodiment 27, wherein said one or more grooves 45 extend along at least 10% of a total length of said bottom sheet outer periphery 41. For example, bottom sheet 40 may comprise a single groove 45 extending along one side of bottom sheet 40 extending in a width direction.

29. The urine collection system 100 of embodiment 27 or 28, wherein said one or more grooves 45 extend along at least 50% of a total length of said bottom sheet outer periphery 41. For example, bottom sheet 40 may comprise grooves 45 extending along (i) one side of bottom sheet 40 extending in a width direction, and (i) one side of bottom sheet 40 extending in a length direction.

30. The urine collection system 100 of any one of embodiments 27 to 29, wherein said one or more grooves 45 extend along 100% a total length of said bottom sheet outer periphery 41. For example, bottom sheet 40 may comprise grooves 45 extending along all edges of the bottom sheet 40 similar to exemplary bottom sheet 40 shown in FIGS. 1-3, and 11-12.

31. The urine collection system 100 of any one of embodiments 27 to 30, wherein said groove length GL ranges from about 1.0 ft to about 8.0 ft, said groove width GW ranges from about 1.0 cm to about 5.0 cm, and said groove depth GD ranges from about 1.0 cm to about 3.0 cm.

32. The urine collection system 100 of any one of embodiments 27 to 31, wherein said bottom sheet 40 comprises a polymeric sheet 40'. It should be understood that bottom sheet 40 may be formed from any type of polymer, and/or other elastomeric materials, either alone or in combination with one another and other possible materials such as synthetic (e.g., polymeric) or natural (e.g., cellulosic) fibers.

33. The urine collection system 100 of any one of embodiments 27 to 32, wherein said bottom sheet 40 comprises a polypropylene sheet 40'.

34. The urine collection system 100 of any one of embodiments 27 to 33, wherein said bottom sheet 40 has a bottom sheet length LBS of up to about 8.0 ft, a bottom sheet width WBS of up to about 6.0 ft, and a bottom sheet thickness TBS of up to about 5.0 centimeters (cm). See again, FIGS. 11-12. Typically, bottom sheet 40 has (i) a bottom sheet length LBS, and (ii) a bottom sheet width WBS that are similar to the perforated sheet length LS and the perforated sheet width WS, respectively, of perforated sheet 10.

35. The urine collection system 100 of any one of embodiments 27 to 34, wherein said bottom sheet 40 has a bottom sheet length LBS of from about 2.0 ft to about 4.0 ft, a bottom sheet width WBS of from about 2.0 ft to about 4.0 ft, and a bottom sheet thickness TBS of from about 1.0 cm to about 1.5 cm.

36. The urine collection system 100 of any one of embodiments 27 to 35, wherein said plurality of support members 20 temporarily connect to said major surface portion 42' of said bottom sheet upper surface 42.

37. The urine collection system 100 of any one of embodiments 27 to 36, wherein said plurality of support members 20 temporarily connect to said major surface portion 42' of said bottom sheet upper surface 42, and comprise a plurality of suction cups 21.

38. The urine collection system 100 of any one of embodiments 34 to 37, wherein said bottom sheet 40 further comprises sheet structure that causes urine to flow from a head end 46 of said bottom sheet 40 towards a foot end 47 of said bottom sheet 40.

Figure 13:
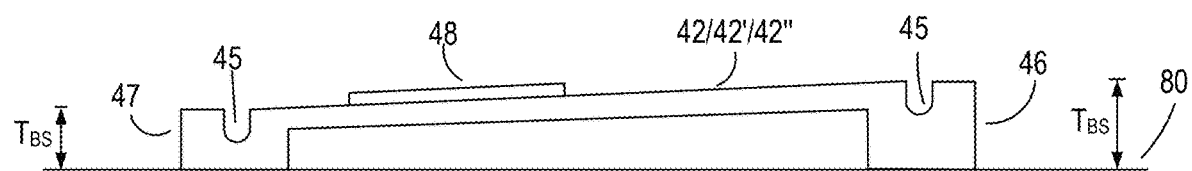
FIG. 13 is a possible cross-sectional view of the exemplary bottom sheet shown in FIG. 11 as viewed along line 13-13 shown in FIG. 11.
Figure 14:
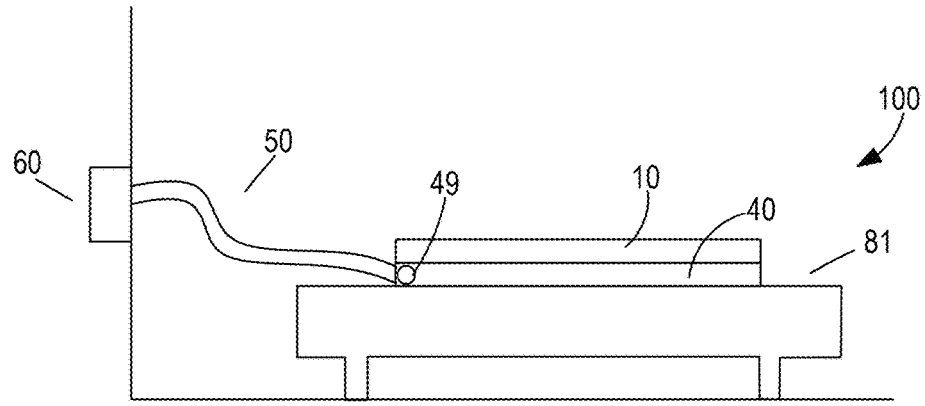
FIG. 14 is a side view of another exemplary urine collection system of the present invention, wherein the exemplary urine collection system comprises a perforated sheet as shown in FIG. 4 in combination with a bottom layer as shown in FIGS. 1-3 and 11-13, and a wall suction system.

39. The urine collection system 100 of embodiment 38, wherein said sheet structure comprises an inclined surface 42" along said major surface portion 42' of said bottom sheet upper surface 42. See, for example, FIG. 13, which shows a possible cross-sectional view of bottom sheet 40 shown in FIG. 11, wherein head end 46 of said bottom sheet 40 is higher (i.e., TBS is greater at head end 46 than TBS at foot end 47 as shown in FIG. 13). It should be understood that in other embodiments, bottom sheet thickness TBS is substantially constant along bottom sheet 40.

40. The urine collection system 100 of embodiment 39, wherein said inclined surface 42″ further comprises surface undulations 48 that guide urine towards said foot end 47 of said bottom sheet 40. See again, FIGS. 11-13.

41. The urine collection system 100 of any one of embodiments 27 to 40, wherein said bottom sheet 40 further comprises a urine outlet 49, said urine outlet 49 being connectable to a suction system, such as a wall suction system 60. See, for example, FIG. 14. It should be understood that other types of suction systems (not shown) may be used to remove urine from bottom sheet 40. For example, a portable suction system (not shown) that can be transported along with a patient (not shown) may be used with the urine collection system 100 of the present invention.

42. The urine collection system 100 of any one of embodiments 27 to 41, further comprising a length of tubing 50 capable of connecting said urine outlet 49 to a suction system, such as a wall suction system 60. See again, for example, FIG. 14.

43. The urine collection system 100 of any one of embodiments 1 to 42, further comprising a wall suction system 60.

44. The urine collection system 100 of any one of embodiments 1 to 42, further comprising a portable suction system (not shown).

Methods of Making Urine Collection Systems

45. A method of making the urine collection system 100 of any one of embodiments 1 to 44, said method comprising: forming the perforated sheet 10.

46. The method of embodiment 45, wherein said forming the perforated sheet 10 step comprises at least one of: thermoforming the perforated sheet 10 using one or more extruder surfaces, cutting the perforated sheet 10, thermoforming the perforated sheet 10 using one or more extruder surfaces, and punching the plurality of perforated sheet apertures 14 in the perforated sheet 10.

47. The method of embodiment 45 or 46, said method further comprising: forming the bottom sheet 40.

48. The method of embodiment 47, wherein said forming the bottom sheet 40 step comprises at least one of: thermoforming the bottom sheet 40 using one or more extruder surfaces, cutting the bottom sheet 40, and thermoforming the bottom sheet 40 using one or more mold surfaces.

49. The method of any one of embodiments 45 to 48, further comprising positioning the absorbent layer 30 below the perforated sheet 10.

50. The method of any one of embodiments 46 to 49, wherein said forming the perforated sheet 10 step comprises further comprising: forming the plurality of support members 20 extending from the perforated sheet lower surface 13.

51. The method of embodiment 50, wherein (i) said forming the perforated sheet 10 step, and (ii) said forming the plurality of support members 20 step occur simultaneously.

Methods of Using Urine Collection Systems

52. A method of collecting urine from a patient (not shown), said method comprising positioning the perforated sheet 10 of any one of embodiments 1 to 44 under the patient.

53. The method of embodiment 52, further comprising: positioning the absorbent layer 30 between the perforated sheet 10 and the patient.

54. The method of embodiment 52 or 53, further comprising: positioning the bottom layer 40 between the perforated sheet 10 and the patient, and when present, below the absorbent layer 30.

55. The method of any one of embodiments 52 to 54, further comprising: attaching the urine collection system 100 to a suction system, such as a wall suction system 60.

56. The method of any one of embodiments 53 to 55, further comprising: replacing the absorbent layer 30 with a replacement absorbent layer 30.

57. The method of any one of embodiments 52 to 56, further comprising: replacing the perforated sheet 10 with a replacement perforated sheet 10.

58. The method of any one of embodiments 52 to 57, further comprising: measuring and monitoring a patient's urine output using the urine collection system 100. Such a step may be used to carefully monitor/manage fluid flow into and out of a given patient.

Further Embodiment

Figure 18:
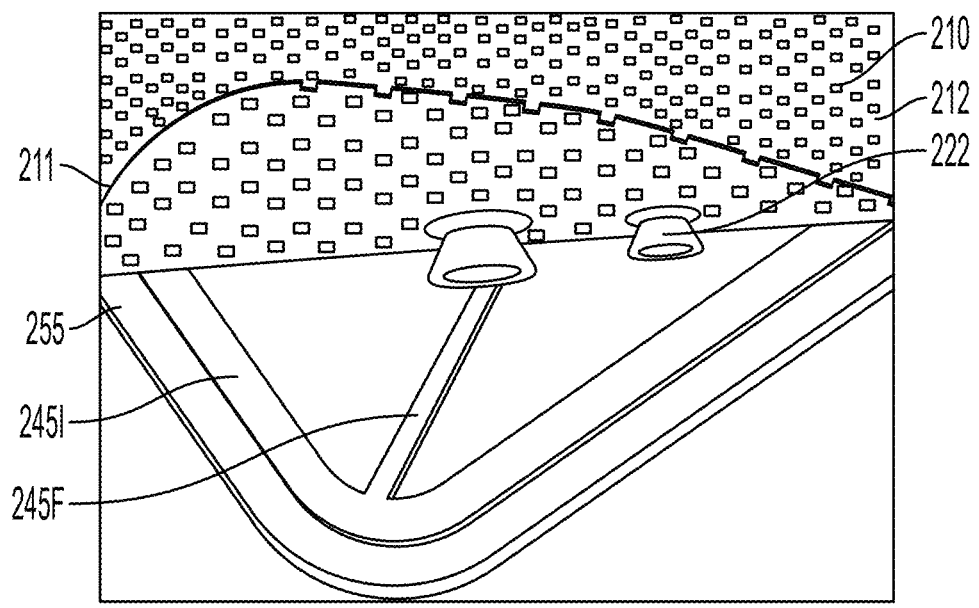
FIG. 18 is a perspective view showing an example of how a perforated sheet is attached to the top of the bottom sheet of FIG. 15.

A bottom sheet 200 according to a further embodiment is shown in FIGS. 15-18. Various components of this bottom sheet 200, such as the bottom sheet upper surface 242, grooves 245A-245I, and the substantially horizontal upper lip 255 (which may be used as an attachment surface for the perforated sheet 210 as shown in FIG. 18), are similar to corresponding features described above in relation to FIGS. 11 and 12 and the alternative embodiment shown in FIG. 13. However, in the current embodiment, the arrangement, structure and placement of various components have been improved to better account, for example, for the impact of the weight of the patient on the urine collection system during use. The bottom sheet 200 may be suitable for use with any of the various perforated sheets described herein.

Turning to FIGS. 15-18, the bottom sheet 200 has an interior upper surface 242 that defines a central collection area 248 and a network of interior radial grooves 245A-245H that extend outwardly (e.g., in a linear fashion) from the central collection area 248. In the embodiment shown in FIGS. 15-18, the interior radial grooves 245A-245H extend to a perimeter groove 245I that extends at least substantially around the perimeter of the interior portion of the bottom sheet's upper surface 242. In particular embodiments, the various grooves 245A-245I are all sufficiently recessed and dimensioned into the bottom sheet's upper surface 242 to form collection channels for liquid, such as urine and blood. In addition, in various embodiments, adjoining grooves may be in liquid communication with each other.

As may be further understood from FIGS. 15-18, the respective proximal ends of the interior radial grooves 245A-245H are in liquid communication with the central collection area 248, and the respective distal ends of the interior radial grooves 245A-245H are in liquid communication with the outer perimeter groove 245I. As a result, liquid may flow from the interior of the outer perimeter groove 245I, into one or more of the interior radial grooves 245A-245H, and into the central collection area 248. The liquid may then flow and/or be drawn away from the patient's body by gravity and/or via liquid conduit 260 that is connected, at its distal end 262, to a vacuum source.

Figure 16:
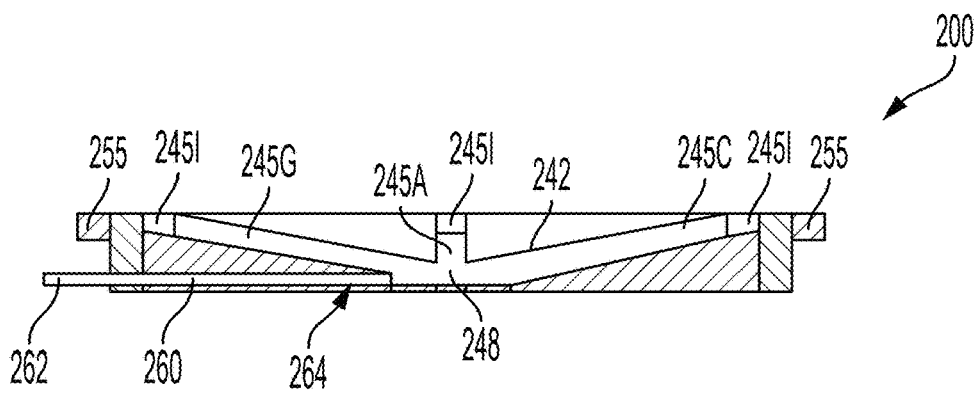
FIG. 16 is a cross-sectional view taken along line 16-16 shown in FIG. 15.
Figure 17:
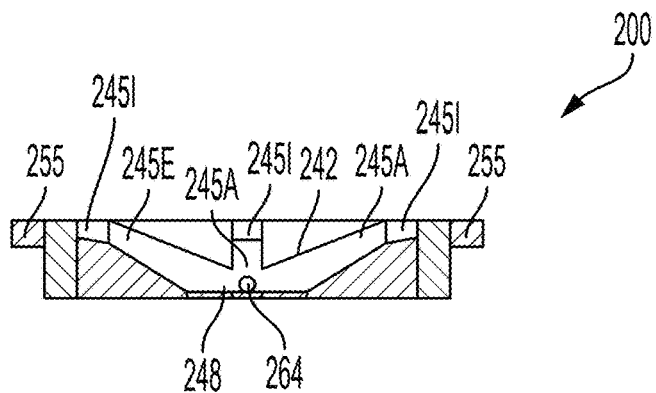
FIG. 17 is a cross-sectional view taken along line 17-17 shown in FIG. 15.

Turning to FIG. 16, the bottom sheet's interior upper surface 242 may be sloped towards the central collection area 248 so that liquid is drawn towards the central collection area 248 under the force of gravity. The sloped path along each of the interior radial grooves 245A-245H may be substantially linear to avoid liquid pooling at different vertical levels along the path as it travels from a relatively high vertical position along the path to a lower vertical position along the path.

Figure 15:
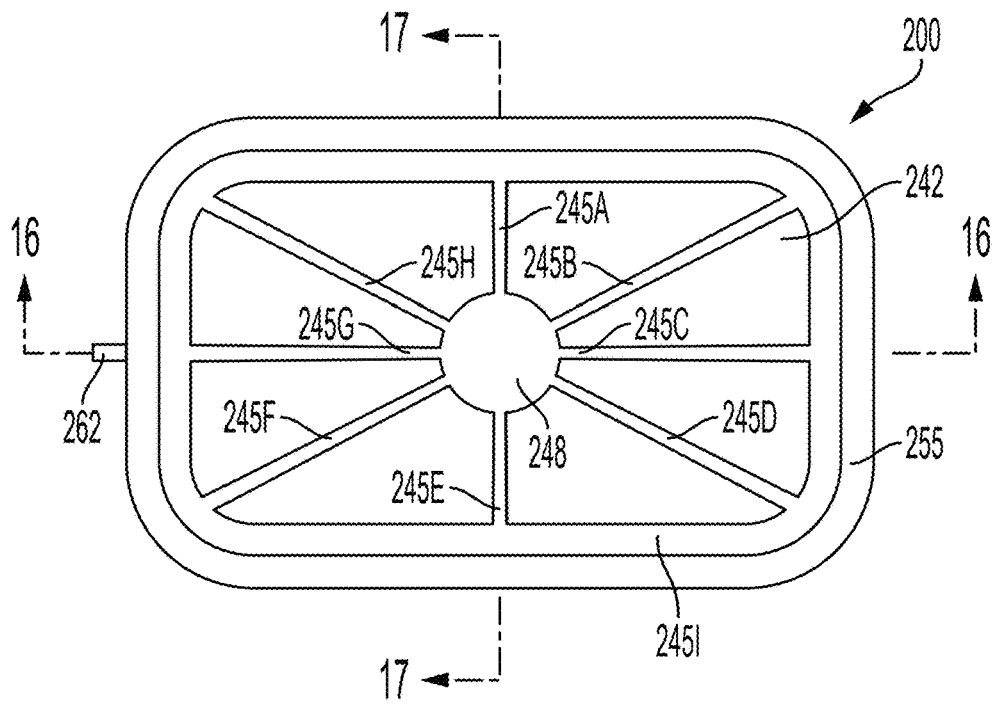
FIG. 15 is a top plan view of a bottom sheet according to a further embodiment.

As may be understood from FIG. 15, in a particular embodiment, the bottom sheet 200 includes eight interior radial grooves 245A-245H that are distributed substantially evenly and radially about the central collection area 248, which may be substantially circular or any other suitable shape. However, in alternative embodiments, there may be more or fewer interior radial grooves. In particular embodiments, the central collection area 248 may be vertically lower than the inner ends of the interior radial grooves 245A-245H.

As shown in FIG. 18, a perforated sheet 210, such as any of the various perforated sheets described above, may attach to the bottom sheet's outer perimeter via any suitable fastener that, for example, attaches to a substantially horizontal upper lip 255 that extends around the outer perimeter of the bottom sheet 200 at a vertical level that is higher than the interior portion of the bottom sheet's upper surface 242. The perforated sheet 210 may be attached so that the sheet remains taut and substantially unwrinkled, which may help maintain vertical space between the perforated sheet 210 and the interior portion of the bottom sheet's upper surface 242. This may prevent physical interference between the perforated sheet 210 and liquid as the liquid flows along the bottom sheet's upper surface 242 (e.g., within the grooves) and into the central collection area 248.

Figure 19:
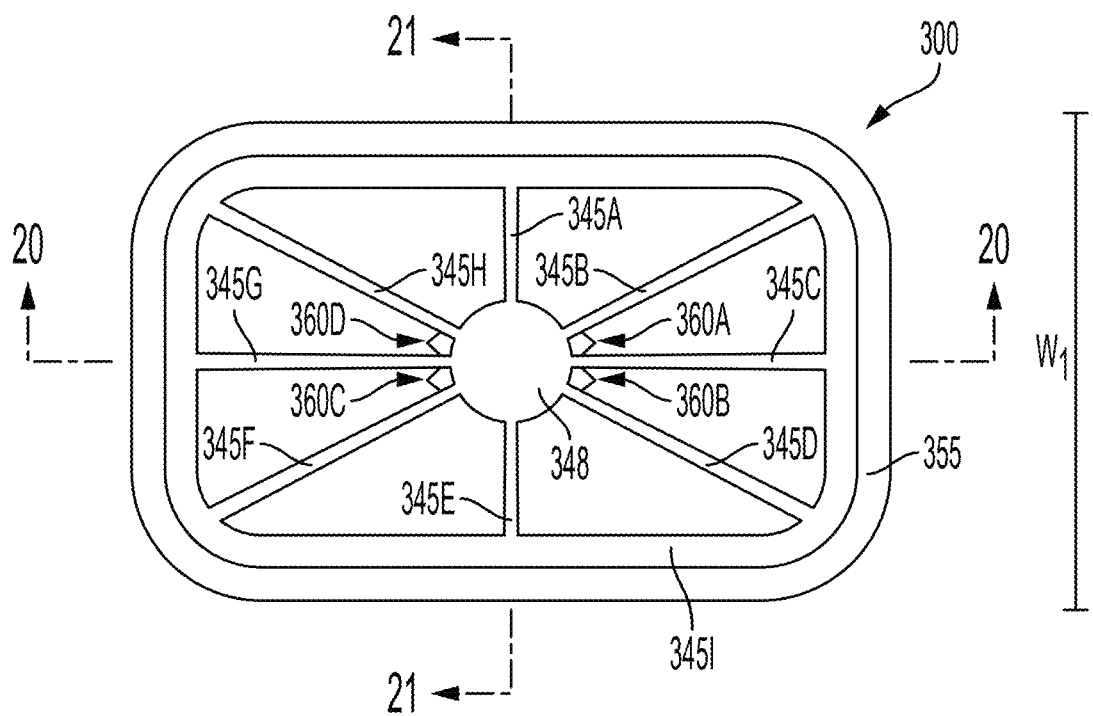
FIG. 19 is a top plan view of a bottom sheet according to a further embodiment.
Figure 20:
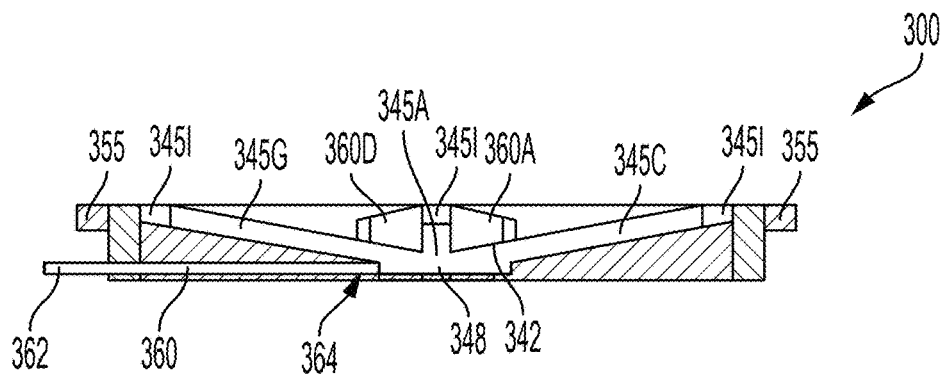
FIG. 20 is a cross-sectional view taken along line 20-20 shown in FIG. 19.
Figure 21:
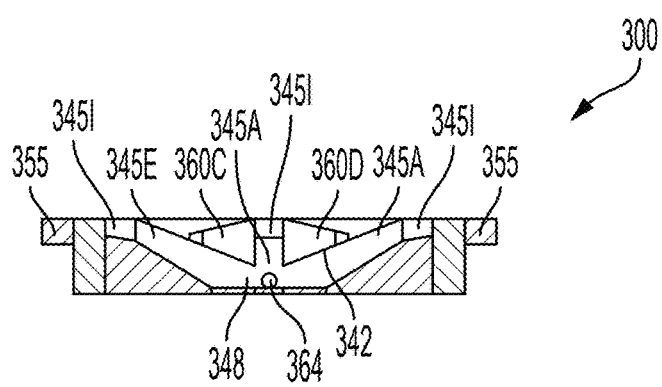
FIG. 21 is a cross-sectional view taken along line 21-21 shown in FIG. 19.
Figure 22:
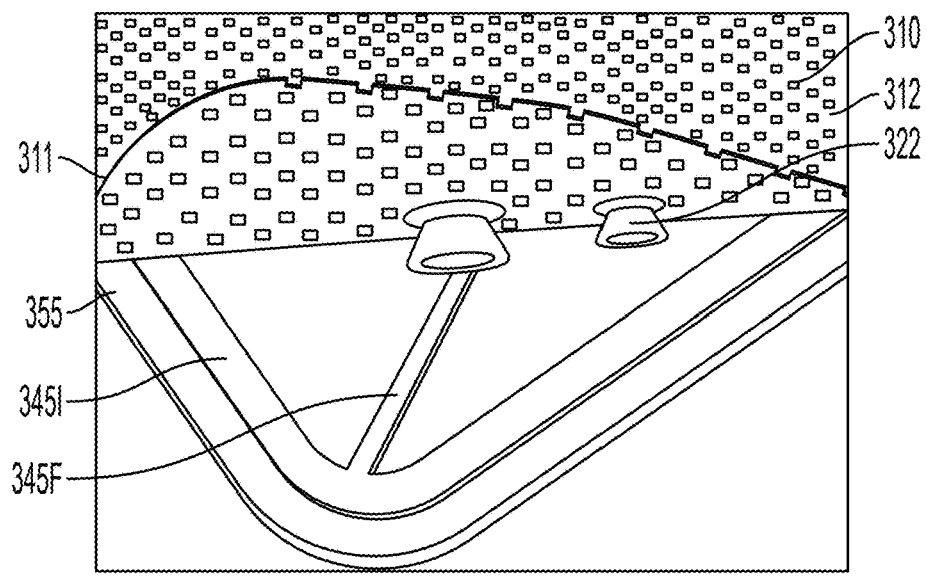
FIG. 22 is a perspective view showing an example of how a perforated sheet is attached to the top of the bottom sheet of FIG. 19.

FIGS. 19-21 show a variation of FIGS. 15-18 in which corresponding components are denoted with part numbers beginning with 3 rather than 2. For example, the outer perimeter groove 245I of FIG. 15 is denoted as number 345I in FIG. 19. In the embodiment shown in FIGS. 19-21, vertical spacers 360A-360D are provided to maintain a vertical separation between the perforated sheet 310 and the bottom sheet's upper surface 342. In particular embodiments, these spacers 360A-360D may be comprised of a soft yet resilient material, such as foam, to provide added comfort to the patient. In particular embodiments, the tops of the supports 360A-360D may be angled downwardly as the supports 360A-360D extend away from the central collection area 348 so that if liquid is discharged onto the top of the supports 360A-360D, the liquid flows off of the supports 360A-360D and onto the bottom sheet's upper surface 342. As shown in FIG. 19, the distal ends of the supports 360A-360D may similarly be angled to form a peak to facilitate liquid flowing around the supports 360A-360D and into one of the grooves 345A-345H and/or central collection area 348.

To use the urine collection system 200, a user may position the perforated sheet 210 so that the perforated sheet 210 covers the entire top of the bottom sheet 200. The user then attaches the perforated sheet 210 to the lip 255 of the bottom sheet 200 that extends around the bottom sheet's perimeter. The user may do this, for example, as shown in FIG. 18, by attaching suction cups 222, which are attached along the outer perimeter of the bottom of the perforated sheet 210, to the upper surface of the bottom sheet's lip 255. Once this is done, the perforated sheet 210 extends, preferably in a taut orientation, over the bottom sheet 200 e.g., so that liquid can't pass downwardly onto the bottom sheet without first passing through the perforated sheet 210.

Next, the user connects the outlet 262 of the bottom sheet's liquid conduit 260 to a suction source (e.g., a vacuum). In various embodiments, the outlet 262 includes a standard connector (e.g., a quick-connect or diameter indexed safety system threaded connector) for connecting to medical-suction-grade tubing. In this case, the tubing may be connected to a hospital suction source, such as a vacuum wall outlet, which provides suction to the end of the tubing.

After the outlet 262 is connected to the suction source, the user positions the combined perforated sheet 210 and bottom sheet 200 horizontally under the central portion of the patient's body so that, if the patient urinates, the urine will preferably flow through the perforated sheet 210 and into the bottom sheet 200 (preferably directly into or near the central collection area 248). If urine flows onto the bottom sheet 200 away from the central collection area 248, the urine will preferably flow, under the influence of gravity, into one or more of the grooves 245A-245I, and then into the central collection area 248, where it is removed through the liquid conduit 260 by the hospital suction source. As noted above, the perforated sheet may be replaced as needed to keep the patient's skin dry.

In this embodiment and related embodiments, the suction source is used to provide substantially continuous suction to a central area of the urine collection system while the urine collection system is in use. In various embodiments, this provides the advantage of keeping the patient's groin and inner thigh areas dry, which can, in turn, avoid moisture-related sores. In particular embodiments, the urine collection system may eliminate the need to replace the perforated sheet and/or lower sheet, or at least decrease the frequency of any necessary changes of these items. Accordingly, the urine collection system may result in substantially less patient discomfort and reduce or eliminate the need for hospital staff to spend the significant time needed to change wet pads.

Although various embodiments are described above as using a suction source to remove urine from the bottom sheet 200, in other embodiments, urine is removed manually from the bottom sheet 200. Despite structural variations, it should be understood that the embodiment of FIGS. 19-22 functions and is used similarly to the embodiment shown in FIGS. 15-18.

CONCLUSION

It should be understood that, although the above-described urine collection systems and methods are described as "comprising" one or more features, components or steps, the above-described urine collection systems, and methods may "comprise," "consists of," or "consist essentially of" any of the above-described features, components or steps of the urine collection systems, and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a urine collection system and/or method that "comprises" a list of elements (e.g., components or steps) is not necessarily limited to only those elements (or components or steps), but may include other elements (or components or steps) not expressly listed or inherent to the urine collection system and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a urine collection system and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described urine collection systems, and/or methods may comprise, consist essentially of, or consist of any of the herein-described components, features, and steps, as shown in the figures with or without any feature(s) not shown in the figures. In other words, in some embodiments, the urine collection systems and/or methods of the present invention do not have any additional features other than those shown in the figures, and such additional features, not shown in the figures, are specifically excluded from the urine collection systems and/or methods. In other embodiments, the urine collection systems and/or methods of the present invention do have one or more additional features that are not shown in the figures.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Urine collection systems as described in embodiments 1 to 58 were prepared. The urine collection systems were used to collect urine from one or more patients in a hospital bed setting or nursing home bed setting.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A urine collection system comprising:
  (A) a perforated sheet having a perforated sheet outer periphery, a perforated sheet upper surface, a perforated sheet lower surface, and a plurality of perforated sheet apertures (i) within the perforated sheet outer periphery, and (ii) extending from the perforated sheet upper surface to the perforated sheet lower surface, wherein:
    at least a portion of the perforated sheet apertures comprise a urine backflow feature that allows one-way urine flow through a given perforated sheet aperture while preventing urine backflow through the given perforated sheet aperture; and
  (B) a bottom urine collection sheet positioned below the perforated sheet, the bottom urine collection sheet having a bottom sheet upper surface, a bottom sheet lower surface, and one or more grooves defined by the bottom sheet upper surface, wherein:
    each groove has a respective groove length, groove width, and groove depth that facilitate collection of urine by the bottom sheet.

2. The urine collection system of claim 1, wherein:
  the bottom sheet comprises a central collection area; and
  the one or more grooves facilitate the collection of urine by routing urine toward the central collection area.

3. The urine collection system of claim 2, wherein the one or more grooves are dimensioned to route urine into the central collection area.

4. The urine collection system of claim 3, wherein the central collection area is disposed at or adjacent a central portion of the bottom sheet.

5. The urine collection system of claim 4, wherein the one or more grooves are vertically sloped to route urine into the central collection area when the bottom sheet is oriented substantially horizontally under a patient.

6. The urine collection system of claim 4, wherein the one or more grooves extend from a location adjacent the bottom sheet's perimeter to the central collection area.

7. The urine collection system of claim 4, wherein the one or more grooves comprise at least two grooves that are dimensioned to route urine from a location adjacent the bottom sheet's perimeter into the central collection area.

8. The urine collection system of claim 7, wherein:
  the bottom sheet is substantially rectangular; and
  the at least two grooves comprise:
    a first groove that extends from a first location adjacent a first corner of the bottom sheet to the central collection area;
    a second groove that extends from a second location adjacent a second corner of the bottom sheet to the central collection area; and
    a third groove that extends from a third location adjacent a third corner of the bottom sheet to the central collection area.

9. The urine collection system of claim 8, wherein the at least two grooves further comprise a fourth groove that extends from a fourth location adjacent a fourth corner of the bottom sheet to the central collection area.

10. The urine collection system of claim 9, wherein the at least two grooves comprise:
  a fifth groove that extends between: (a) a fifth location, which is substantially equidistant between the first and second corners of the bottom sheet; and (b) the central collection area.

11. The urine collection system of claim 4, wherein:
  the bottom sheet comprises a particular upper surface portion that extends substantially around an outer perimeter of the bottom sheet; and
  the perforated sheet includes at least one releasable connector for releasably attaching the perforated sheet to the particular upper surface portion.

12. The urine collection system of claim 11, wherein the particular upper surface portion defines a lip that extends at least substantially around the outer perimeter of the bottom sheet.

13. The urine collection system of claim 4, wherein:
the one or more grooves comprise a plurality of grooves.

14. The urine collection system of claim 13, wherein at least substantially all of the perforated sheet apertures comprise the urine backflow feature.

15. The urine collection system of claim 13, wherein:
the bottom sheet further comprises a urine outlet adjacent the central collection area, the urine outlet being connectable to a suction system; and
the urine collection system is adapted to guide urine into the central collection area for removal by the suction system.

16. A method of collecting urine from a patient, the method comprising:
attaching the perforated sheet of claim 1 to the bottom sheet of claim 1 to form a urine collection device in which the perforated sheet covers the bottom sheet;
placing the urine collection device under the patient so that, if the patient urinates, urine flows through the perforated sheet and into the bottom sheet; and
using the urine collection device to collect urine from the patient.

17. The method of claim 16, wherein:
the bottom sheet comprises a central collection area; and
the one or more grooves facilitate the collection of urine by the bottom sheet by routing urine toward the central collection area.

18. The method of claim 17, wherein the one or more grooves are dimensioned to route urine into the central collection area.

19. The method of claim 18, wherein the central collection area is disposed at or adjacent a central portion of the bottom sheet.

20. The method of claim 19, wherein the one or more grooves are vertically sloped to route urine into the central collection area when the bottom sheet is oriented substantially horizontally under a patient.

21. The method of claim 19, wherein the one or more grooves extend from a location adjacent the bottom sheet's perimeter to the central collection area.

22. The method of claim 19, wherein the one or more grooves comprise at least two grooves that are dimensioned to route urine from a location adjacent the bottom sheet's perimeter into the central collection area.

23. The method of claim 19, wherein:
the one or more grooves comprise a plurality of grooves.

* * * * *